US012545621B2

(12) United States Patent
Bland et al.

(10) Patent No.: US 12,545,621 B2
(45) Date of Patent: Feb. 10, 2026

(54) METHOD OF MAKING A GYPSUM PANEL USING A THERMAL OXIDIZER

(71) Applicant: Gold Bond Building Products, LLC, Charlotte, NC (US)

(72) Inventors: Brian Bland, Matthews, NC (US); James Phipps, Mooresville, NC (US); Eli Stav, Charlotte, NC (US)

(73) Assignee: Gold Bond Building Products, LLC, Charlotte, NC (US)

( * ) Notice: Subject to any disclaimer, the term of this patent is extended or adjusted under 35 U.S.C. 154(b) by 371 days.

(21) Appl. No.: 17/972,657

(22) Filed: Oct. 25, 2022

(65) Prior Publication Data

US 2023/0128126 A1   Apr. 27, 2023

Related U.S. Application Data

(60) Provisional application No. 63/271,764, filed on Oct. 26, 2021.

(51) Int. Cl.
| | | |
|---|---|---|
| *B29C 65/00* | (2006.01) | |
| *B28B 19/00* | (2006.01) | |
| *C04B 18/14* | (2006.01) | |
| *C04B 22/06* | (2006.01) | |
| *C04B 24/42* | (2006.01) | |
| *C04B 28/14* | (2006.01) | |
| *C04B 40/00* | (2006.01) | |
| *B29C 65/02* | (2006.01) | |
| *C04B 111/00* | (2006.01) | |

(52) U.S. Cl.
CPC .......... *C04B 24/42* (2013.01); *B28B 19/0092* (2013.01); *C04B 18/146* (2013.01); *C04B 22/064* (2013.01); *C04B 28/14* (2013.01); *C04B 40/0071* (2013.01); *B29C 65/02* (2013.01); *C04B 2111/0062* (2013.01)

(58) Field of Classification Search
CPC ................. B29C 65/02; C04B 24/02
See application file for complete search history.

(56) References Cited

U.S. PATENT DOCUMENTS

| | | | |
|---|---|---|---|
| 6,737,156 B2 | 5/2004 | Koval et al. | |
| 6,770,354 B2 | 8/2004 | Randall et al. | |
| 6,808,793 B2 | 10/2004 | Randall et al. | |
| 7,553,780 B2 | 6/2009 | Smith | |
| 7,635,657 B2 | 12/2009 | Bland et al. | |
| 7,989,370 B2 | 8/2011 | Currier et al. | |
| 8,092,858 B2 | 1/2012 | Smith | |
| 9,410,058 B2 | 8/2016 | Blackburn et al. | |
| 9,879,426 B2 | 1/2018 | Tilford | |
| 9,938,192 B2 | 4/2018 | Moore et al. | |
| 10,232,588 B2 | 3/2019 | Xu et al. | |
| 2003/0211305 A1* | 11/2003 | Koval | E04C 2/043 428/292.4 |
| 2004/0170873 A1* | 9/2004 | Smith | G02B 6/2852 428/703 |
| 2004/0209074 A1 | 10/2004 | Randall et al. | |
| 2009/0084514 A1 | 4/2009 | Smith et al. | |
| 2010/0210445 A1* | 8/2010 | von Rymon Lipinski | C09D 1/00 501/133 |
| 2012/0082839 A1* | 4/2012 | Ha | C04B 16/04 428/221 |
| 2012/0082858 A1 | 4/2012 | Przybysz | |
| 2015/0291844 A1* | 10/2015 | Blackburn | C04B 41/49 428/447 |
| 2015/0306846 A1* | 10/2015 | Xu | C04B 41/4927 106/781 |
| 2018/0345532 A1* | 12/2018 | Randall | C04B 28/145 |
| 2019/0232228 A1* | 8/2019 | Medoff | C12M 47/18 |
| 2020/0002226 A1* | 1/2020 | Bening, Jr. | C04B 28/02 |
| 2020/0078980 A1 | 3/2020 | Wang et al. | |
| 2021/0171398 A1 | 6/2021 | Wang et al. | |
| 2022/0298072 A1 | 9/2022 | Martin | |
| 2022/0411330 A1* | 12/2022 | Blades | C09D 133/10 |

FOREIGN PATENT DOCUMENTS

| | | | |
|---|---|---|---|
| CN | 109956734 A * | 7/2019 | .......... C04B 28/344 |
| WO | WO2014207098 | 12/2014 | |
| WO | WO2019197496 | 10/2019 | |

OTHER PUBLICATIONS

CN 10-9956734A description translation (Year: 2019).*

* cited by examiner

*Primary Examiner* — Philip C Tucker
*Assistant Examiner* — Nickolas R Harm
(74) *Attorney, Agent, or Firm* — Dority & Manning, P.A.

(57) ABSTRACT

The present invention is directed to a method of making such gypsum panel. For instance, the method comprises: providing a first facing material; providing a gypsum slurry including calcium sulfate hemihydrate, water, and a silicon containing compound onto the first facing material; providing a second facing material onto the gypsum slurry to form a continuous gypsum sheet; allowing the calcium sulfate hemihydrate to hydrate to form calcium sulfate dihydrate; cutting the continuous gypsum sheet to form a gypsum panel; supplying the gypsum panel to a heating or drying device; and providing a gaseous mixture from the heating or drying device to a regenerative thermal oxidizer.

23 Claims, No Drawings

METHOD OF MAKING A GYPSUM PANEL USING A THERMAL OXIDIZER

CROSS-REFERENCE TO RELATED APPLICATION

The present application claims filing benefit of U.S. Provisional Patent Application Ser. No. 63/271,764 having a filing date of Oct. 26, 2021, which is incorporated herein by reference in its entirety.

BACKGROUND OF THE INVENTION

Gypsum panels are commonly employed in drywall construction of interior and exterior walls and ceilings and also has other applications. Generally, these gypsum panels are formed from a gypsum slurry including a mixture of calcined gypsum, water, and other additives. The mixture is cast and allowed to set by reaction of the calcined gypsum with the water. During the production process, free or unreacted water is removed during a drying or heating process in order to provide a relatively dry product. During this drying or heating step, gases and/or particulates may be emitted and may need to be oxidized prior to entering into the environment. However, in some instances, the emissions prior to oxidization may be relatively high thereby resulting in scaling and/or complex oxidation. As a result, this may require emissions treatment and higher capital due to the need to frequently replace oxidizer components. In addition, in some instances, some of these emissions may even go untreated.

As a result, there is a need to provide an improved process of making a gypsum panel that also results in reduced emissions, such as prior to any treatment (e.g., oxidation) before being emitted into the environment.

SUMMARY OF THE INVENTION

In accordance with one embodiment of the present invention, a method of making a gypsum panel is disclosed. The method comprises: providing a first facing material; providing a gypsum slurry including calcium sulfate hemihydrate, water, and a silicon containing compound onto the first facing material; providing a second facing material onto the gypsum slurry to form a continuous gypsum sheet; allowing the calcium sulfate hemihydrate to hydrate to form calcium sulfate dihydrate; cutting the continuous gypsum sheet to form a gypsum panel; supplying the gypsum panel to a heating or drying device; and providing a gaseous mixture from the heating or drying device to a regenerative thermal oxidizer.

DETAILED DESCRIPTION

Reference now will be made in detail to various embodiments. Each example is provided by way of explanation of the embodiments, not as a limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally speaking, the present invention is directed to a method of making a gypsum panel. In particular, the gypsum panel is made using a regenerative thermal oxidizer. The present inventors have discovered that using a regenerative thermal oxidizer in the process can allow for an improvement in the overall process. For instance, the present inventors have discovered that utilizing a regenerative thermal oxidizer may reduce emissions. In addition, the method disclosed herein may also reduce the amount of scaling during the gypsum panel drying process.

For instance, as determined in accordance with EPA Method 5/Method 202, the silica particulate emissions in the gaseous mixture prior to introduction to the thermal oxidizer may be relatively low. In particular, the emissions may be less than 0.035 gr/dscf, such as 0.033 gr/dscf or less, such as 0.031 gr/dscf or less, such as 0.030 gr/dscf or less, such as 0.029 gr/dscf or less, such as 0.028 gr/dscf or less, such as 0.027 gr/dscf or less, such as 0.026 gr/dscf or less, such as 0.025 gr/dscf or less, such as 0.023 gr/dscf or less, such as 0.022 gr/dscf or less, such as 0.021 gr/dscf or less, such as 0.020 gr/dscf or less. Such emissions values may be based on an average of at least three samples.

In general, the present invention is directed to a method of making a gypsum panel. For instance, in the method of making a gypsum panel, a first facing material may be provided wherein the first facing material has a first facing material surface and a second facing material surface opposite the first facing material surface. The first facing material may be conveyed on a conveyor system (i.e., a continuous system for continuous manufacture of gypsum panel). Thereafter, a gypsum slurry may be provided or deposited onto the first facing material in order to form and provide a gypsum core. Next, a second facing material may be provided onto the gypsum slurry which is formed into a gypsum core. Providing the second facing material onto the gypsum slurry may allow for the formation of a continuous gypsum sheet, in particular a continuous green or wet green sheet.

In this regard, the first facing material and the second facing material sandwich the gypsum core. Accordingly, the gypsum panel includes a gypsum core having a gypsum layer surface. In particular, the gypsum layer surface includes a first gypsum layer surface and a second gypsum layer surface opposing the first gypsum layer surface. A facing material is provided on the gypsum layer surface. For instance, a first facing material is provided on the first gypsum layer surface and a second facing material is provided on the second gypsum layer surface.

In general, the facing material may be any facing material as generally employed in the art. For instance, the facing material may be a paper facing material, a fibrous (e.g., glass fiber) mat facing material, or a polymeric facing material. In general, the first facing material and the second facing material may be the same type of material. Alternatively, the first facing material may be one type of material while the second facing material may be a different type of material.

In one embodiment, the facing material may include a paper facing material. For instance, both the first and second facing materials may be a paper facing material. Alternatively, in another embodiment, the facing material may be a glass mat facing material. For instance, both the first and second facing materials may be a glass mat facing material. In a further embodiment, the facing material may be a polymeric facing material. For instance, both the first and second facing materials may be a polymeric facing material. In another further embodiment, the facing material may be a metal facing material (e.g., an aluminum facing material). For instance, both the first and second facing materials may be a metal facing material (e.g., an aluminum facing material).

The glass mat facing material in one embodiment may be coated. However, in one particular embodiment, the glass mat facing material may not have a coating, such as a coating that is applied to the surface of the mat.

In addition, the composition of the gypsum slurry and gypsum core is not necessarily limited. Generally, in one embodiment, the gypsum core is made from a gypsum slurry including at least stucco and water. In this regard, the method may include a step of combining the stucco, water, and any optional additives as indicated herein. However, as indicated herein, the gypsum slurry may also include a silicon containing compound as defined herein and optionally, a siloxane. In this regard, the method may include a step of combining the silicon containing compound and optionally, the siloxane with the stucco, water, and any optional additives as indicated herein. In one embodiment, the slurry includes both the silicon containing compound and the siloxane.

In general, stucco may be referred to as calcined gypsum or calcium sulfate hemihydrate. The calcined gypsum may be from a natural source or a synthetic source and is thus not necessarily limited by the present invention. In addition to the stucco, the gypsum slurry may also contain some calcium sulfate dihydrate or calcium sulfate anhydrite. If calcium sulfate dihydrate is present, the hemihydrate is present in an amount of at least 50 wt. %, such as at least 60 wt. %, such as at least 70 wt. %, such as at least 80 wt. %, such as at least 85 wt. %, such as at least 90 wt. %, such as at least 95 wt. %, such as at least 98 wt. %, such as at least 99 wt. % based on the weight of the calcium sulfate hemihydrate and the calcium sulfate dihydrate. Furthermore, the calcined gypsum may be α-hemihydrate, β-hemihydrate, or a mixture thereof.

In general, the gypsum, in particular the calcium sulfate dihydrate, is present in the gypsum core in an amount of at least 50 wt. %, such as at least 60 wt. %, such as at least 70 wt. %, such as at least 80 wt. %, such as at least 90 wt. %, such as at least 95 wt. %, such as at least 98 wt. %, such as at least 99 wt. %. The gypsum is present in an amount of 100 wt. % or less, such as 99 wt. % or less, such as 98 wt. % or less, such as 95 wt. % or less, such as 90 wt. % or less based on the weight of the solids in the gypsum slurry. In one embodiment, the aforementioned weight percentages are based on the weight of the gypsum core. In another embodiment, the aforementioned weight percentages are based on the weight of the gypsum panel.

In addition to the stucco, the gypsum slurry may also contain other hydraulic materials. These hydraulic materials may include calcium sulfate anhydrite, land plaster, cement, fly ash, or any combinations thereof. When present, they may be utilized in an amount of 30 wt. % or less, such as 25 wt. % or less, such as 20 wt. % or less, such as 15 wt. % or less, such as 10 wt. % or less, such as 8 wt. % or less, such as 5 wt. % or less based on the total content of the hydraulic material.

As indicated above, the gypsum slurry may also include water. Water may be employed for fluidity and also for rehydration of the gypsum to allow for setting. The amount of water utilized is not necessarily limited by the present invention.

The weight ratio of the water to the stucco may be 0.1 or more, such as 0.2 or more, such as 0.2 or more, such as 0.3 or more, such as 0.4 or more, such as 0.5 or more. The water to stucco weight ratio may be 4 or less, such as 3.5 or less, such as 3 or less, such as 2.5 or less, such as 2 or less, such as 1.7 or less, such as 1.5 or less, such as 1.4 or less, such as 1.3 or less, such as 1.2 or less, such as 1.1 or less, such as 1 or less, such as 0.9 or less, such as 0.85 or less, such as 0.8 or less, such as 0.75 or less, such as 0.7 or less, such as 0.6 or less, such as 0.5 or less, such as 0.4 or less, such as 0.35 or less, such as 0.3 or less, such as 0.25 or less, such as 0.2 or less.

As indicated herein, the gypsum slurry and resulting gypsum core may include a silicone containing compound and optionally a siloxane. In one embodiment, both the silicon containing compound and the siloxane are included in the slurry and resulting panel. In general, the silicon containing compound may be a compound that is not a siloxane. In this regard, the silicon containing compound may be a siliconate, silica fume, or a mixture thereof. In one embodiment, the silicon containing compound comprises a siliconate. In another embodiment, the silicon containing compound comprises silica fume. In a further embodiment, the silicon containing compound comprises both a siliconate and silica fume.

Without intending to be limited by theory, use of both the siloxane and silicon containing compound may be able to reduce VOCs, formaldehyde, and particulates during the gypsum panel manufacturing process. For instance, the silicon containing compound may be utilized to react/cross-link the siloxane thereby increasing the molecular weight of the siloxane. For example, the silicon containing compound may be utilized to increase the pH of the gypsum slurry thereby allowing for the siloxane to react/cross-link. In particular, use of the silicon containing compound may allow for the reaction/cross-link to occur at a faster rate. In one embodiment, the silicon containing compound may also serve as a crosslinker for the siloxane.

In one embodiment, the silicon containing compound may be a siliconate. It should be understood that the siliconate may be any suitable compound. In general, the siliconate may have the following general structure (I):

wherein
  $R_1$ is H, halogen, alkyl, aryl, heteroaryl, cycloalkyl, haloalkyl, haloaryl, perhaloalkyl, or perhaloaryl; and
  M is an alkali metal.

As indicated above, $R_1$ may be H, halogen, alkyl, aryl, heteroaryl, cycloalkyl, haloalkyl, haloaryl, perhaloalkyl, or perhaloaryl. In this regard, in one embodiment, $R_1$ may be H. In another embodiment, $R_1$ may be cycloalkyl, such as a $C_3$-$C_8$ cycloalkyl, such as a $C_4$-$C_8$ cycloalkyl, such as a $C_6$-$C_8$ cycloalkyl. In a further embodiment, $R_1$ may be aromatic, such as a $C_4$-$C_8$ aromatic, such as a $C_5$-$C_8$ aromatic, such as a $C_6$-$C_8$ aromatic. In one particular embodiment, $R_1$ may be alkyl. For instance, the alkyl may have 1 or more, such as 2 or more, such as 3 or more, such as 4 or more, such as 5 or more carbon atoms. The alkyl may have 20 or less, such as 16 or less, such as 12 or less, such as 10 or less, such as 8 or less, such as 6 or less, such as 5 or less, such as 4 or less, such as 3 or less, such as 2 or less carbon atoms. For instance, in one embodiment, $R_1$ may be methyl. In another embodiment, $R_1$ may be ethyl. In a further embodiment, $R_1$ may be propyl. In an even further embodiment, $R_1$ may be butyl.

As indicated above, M is an alkali metal. In one embodiment, M may be an alkali metal. For instance, the alkali metal may be lithium, sodium, or potassium. In one embodiment, M may be lithium. In another embodiment, M may be sodium. In a further embodiment, M may be potassium.

Examples of the siliconate include, but are not limited to, sodium methylsiliconate, potassium methylsiliconate, sodium ethylsiliconate, potassium ethylsiliconate, sodium propylsiliconate, potassium propylsiliconate, sodium isopropylsiliconate, potassium isopropylsiliconate, sodium butylsiliconate, potassium butylsiliconate, sodium hexylsiliconate, potassium hexylsiliconate, sodium octylsiliconate, potassium octylsiliconate, or a mixture thereof. In one embodiment, the siliconate may be sodium methylsiliconate, potassium methylsiliconate, or a mixture thereof. In one particular embodiment, the siliconate may be potassium methylsiliconate.

In one embodiment, the silicon containing compound may be a silica fume. In general, silica fume is an amorphous polymorph of silicon dioxide. For instance, the silica fume may be an amorphous silica by-product of the silicon and ferrosilicon alloy production. As an example, the silica fume may be produced by capturing the finely divided particles from stack gases of electric arc furnaces. In one embodiment, the silica fume may be a spherical shape. The average diameter may be 1 μm or less, such as 0.9 μm or less, such as 0.8 μm or less, such as 0.7 μm or less, such as 0.6 μm or less, such as 0.5 μm or less, such as 0.4 μm or less, such as 0.3 μm or less, such as 0.2 μm or less. The average diameter may be 0.01 μm or more, such as 0.03 μm or more, such as 0.05 μm or more, such as 0.08 μm or more, such as 0.1 μm or more, such as 0.13 μm or more, such as 0.15 μm or more, such as 0.2 μm or more, such as 0.25 μm or more, such as 0.3 μm or more. In the silica fume, the primary component is silicon dioxide. For instance, it may be present in an amount of 50 wt. % or more, such as 60 wt. % or more, such as 70 wt. % or more, such as 80 wt. % or more, such as 90 wt. % or more, such as 93 wt. % or more, such as 95 wt. % or more, such as 97 wt. % or more, such as 98 wt. % or more.

The silicon containing compound, such as the siliconate, may be present in the gypsum slurry in an amount of 0.001 wt. % or more, such as 0.01 wt. % or more, such as 0.02 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more based on the weight of the stucco. The silicon containing compound, such as the siliconate, may be present in an amount of 10 wt. % or less, such as 7 wt. % or less, such as 5 wt. % or less, such as 4 wt. % or less, such as 3 wt. % or less, such as 2.5 wt. % or less, such as 2 wt. % or less, such as 1.8 wt. % or less, such as 1.5 wt. % or less, such as 1 wt. % or less, such as 0.8 wt. % or less, such as 0.6 wt. % or less, such as 0.5 wt. % or less, such as 0.4 wt. % or less, such as 0.35 wt. % or less, such as 0.2 wt. % or less based on the weight of the stucco. In another embodiment, such weight percentage may be based on the weight of the gypsum slurry. In a further embodiment, such weight percentage may be based on the solids content of the gypsum slurry. In one embodiment, such weight percentage may be based on the weight of the gypsum panel. In an even further embodiment, such weight percentage may be based on the weight of the gypsum core.

Similarly, the silicon containing compound, such as the siliconate, may be present in the gypsum slurry in an amount of 0.001 lbs/ft$^3$ or more, such as 0.005 lbs/ft$^3$ or more, such as 0.01 lbs/ft$^3$ or more, such as 0.05 lbs/ft$^3$ or more, such as 0.1 lbs/ft$^3$ or more, such as 0.2 lbs/ft$^3$ or more, such as 0.5 lbs/ft$^3$ or more, such as 1 lbs/ft$^3$ or more, such as 1.5 lbs/ft$^3$ or more, such Is it as 2 lbs/ft$^3$ or more, such as 2.5 lbs/ft$^3$ or more, such as 3 lbs/ft$^3$ or more, such as 3.5 lbs/ft$^3$ or more, such as 4 lbs/ft$^3$ or more, such as 4.5 lbs/ft$^3$ or more, such as 5 lbs/ft$^3$ or more, such as 10 lbs/ft$^3$ or more, such as 15 lbs/ft$^3$ or more, such as 20 lbs/ft$^3$ or more, such as 25 lbs/ft$^3$ or more, such as 50 lbs/ft$^3$ or more. The silicon containing compound, such as the siliconate, may be present in an amount of 100 lbs/ft$^3$ or less, such as 80 lbs/ft$^3$ or less, such as 60 lbs/ft$^3$ or less, such as 40 lbs/ft$^3$ or less, such as 25 lbs/ft$^3$ or less, such as 20 lbs/ft$^3$ or less, such as 15 lbs/ft$^3$ or less, such as 13 lbs/ft$^3$ or less, such as 11 lbs/ft$^3$ or less, such as 10 lbs/ft$^3$ or less, such as 9 lbs/ft$^3$ or less, such as 8 lbs/ft$^3$ or less, such as 7 lbs/ft$^3$ or less, such as 6 lbs/ft$^3$ or less, such as 5 lbs/ft$^3$ or less, such as 4 lbs/ft$^3$ or less, such as 3 lbs/ft$^3$ or less, such as 2 lbs/ft$^3$ or less, such as 1 lbs/ft$^3$ or less, such as 0.7 lbs/ft$^3$ or less, such as 0.5 lbs/ft$^3$ or less, such as 0.4 lbs/ft$^3$ or less, such as 0.3 lbs/ft$^3$ or less, such as 0.2 lbs/ft$^3$ or less, such as 0.2 lbs/ft$^3$ or less. In one embodiment, the silicon containing compound, such as the siliconate, may be present in the gypsum slurry in the above amounts in units of lbs/MSF.

As indicated above, a siloxane may also be utilized. The siloxane may be a polyorganosilxoane. Silicon-bonded organic groups used may contain monovalent hydrocarbon and/or monovalent halogenated hydrocarbon groups. Such monovalent groups may have from 1 to about 20 carbon atoms, preferably from 1 to 10 carbon atoms, and are exemplified by, but not limited to, alkyl (e.g., methyl, ethyl, propyl, pentyl, octyl, undecyl, and octadecyl); cycloalkyl (e.g., cyclohexyl); alkenyl (e.g., vinyl, allyl, butenyl, and hexenyl); aryl (e.g., phenyl, tolyl, xylyl, benzyl, and 2-phenylethyl); and halogenated hydrocarbon groups (e.g., 3,3,3-trifluoropropyl, 3-chloropropyl, and dichlorophenyl). In general, at least 30%, such as at least 40%, such as about 50% of the organic groups are methyl.

The siloxane may have the following general formula (II):

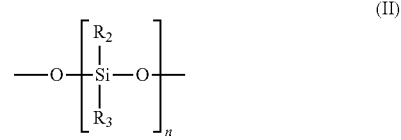

(II)

wherein,
n is an integer greater than 1; and
$R_2$ and $R_3$ are independently hydrogen, halogen, alkyl, cycloalkyl, aryl, heteroaryl, haloalkyl, haloaryl, alkoxy, carboxyalkyl, or alkenyl.

As indicated above, n is an integer greater than 1. In this regard, n may be 1 or more, such as 2 or more, such as 5 or more, such as 10 or more, such as 20 or more, such as 30 or more, such as 50 or more, such as 100 or more. In addition, n may be 500 or less, such as 400 or less, such as 300 or less, such 200 or less, such as 150 or less, such as 125 or less, such as 100 or less, such as 80 or less, such as 60 or less, such as 50 or less, such as 40 or less, such as 30 or less.

As indicated above, $R_2$ and $R_3$ are independently hydrogen, halogen, alkyl, cycloalkyl, aryl, heteroaryl, haloalkyl, haloaryl, alkoxy, carboxyalkyl, or alkenyl. For instance, $R_2$ and $R_3$ may independently be a monovalent group typically containing from 1 to about 20 carbon atoms. The alkyl groups may be methyl, ethyl, propyl, pentyl, octyl, undecyl, octadecyl, etc. The alkoxy groups may be methoxy, ethoxy, propoxy, etc. The carboxyalkyl groups may be acetyl, etc.

The cycloalkyl groups may be cyclohexyl, cyclooctyl, etc. The alkenyl groups may be vinyl, allyl, butenyl, hexenyl, etc. The aryl groups may be phenyl, tolyl, xylyl, benzyl, 2-phenylethyl, etc. The halogenated hydrocarbon groups may be 3,3,3-trifluoropropyl, 3-chloropropyl, dichlorophenyl, etc.

In one embodiment, at least one of $R_2$ and $R_3$ is hydrogen. In another embodiment, only one of $R_2$ and $R_3$ is hydrogen. In a further embodiment, at least one of $R_2$ and $R_3$ is alkyl. For instance, the alkyl may have 1 or more, such as 2 or more, such as 3 or more carbon atoms. The alkyl may have 20 or less, such as 16 or less, such as 12 or less, such as 10 or less, such as 8 or less, such as 6 or less, such as 4 or less, such as 2 or less carbon atoms. In one particular embodiment, only one of $R_2$ and $R_3$ is alkyl. In general, in one particular embodiment, the alkyl may be methyl.

Examples of such siloxanes, such as polyorganosiloxanes, may include, for instance, polydimethylsiloxane ("PDMS"), polymethylhydrogensiloxane, dimethyldiphenylpolysiloxane, dimethyl/methylphenylpolysiloxane, polymethylphenylsiloxane, methylphenyl/dimethylsiloxane, vinyldimethyl terminated polydimethylsiloxane, vinylmethyl/dimethylpolysiloxane, vinyldimethyl terminated vinylmethyl/dimethylpolysiloxane, divinylmethyl terminated polydimethylsiloxane, vinylphenylmethyl terminated polydimethylsiloxane, dimethylhydro terminated polydimethylsiloxane, methylhydro/dimethylpolysiloxane, methylhydro terminated methyloctylpolysiloxane, methylhydro/phenylmethyl polysiloxane, fluoro-modified polysiloxane, etc., or a mixture thereof. In one embodiment, the siloxane, such as the polyorganosiloxane, may be polydimethylsiloxane. In another embodiment, the siloxane, such as the polyorganosiloxane, may be polymethylhydrogensiloxane.

The organopolysiloxane may also contain one more pendant and/or terminal polar functional groups, such as hydroxyl, epoxy, carboxyl, amino, alkoxy, methacrylic, or mercapto groups, which impart some degree of hydrophilicity to the polymer. For example, the organopolysiloxane may contain at least one hydroxy group, and optionally an average of at least two silicon-bonded hydroxy groups (silanol groups) per molecule. Examples of such organopolysiloxanes include, for instance, dihydroxypolydimethylsiloxane, hydroxy-trimethylsiloxypolydimethylsiloxane, etc. Alkoxy-modified organopolysiloxanes may also be employed, such as dimethoxypolydimethylsiloxane, methoxy-trimethylsiloxypolydimethylsiloxane, diethoxypolydimethylsiloxane, ethoxy-trimethylsiloxy-polydimethylsiloxane, etc. Still other suitable organopolysiloxanes are those modified with at least one amino functional group. Examples of such amino-functional polysiloxanes include, for instance, diamino-functional polydimethylsiloxanes.

The siloxane may have a relatively high molecular weight. For example, the siloxane may have a molecular weight of about 500 g/mol or more, such as 1,000 g/mol or more, such as 1,500 g/mol or more, such as 2,000 g/mol or more, such as 3,000 g/mol or more, such as 4,000 g/mol or more, such as 5,000 g/mol or more, such as 10,000 g/mol or more, such as 25,000 g/mol or more. The siloxane may have a molecular weight of 500,000 g/mol or less, such as 400,000 g/mol or less, such as 300,000 g/mol or less, such as 200,000 g/mol or less, such as 150,000 g/mol or less, such as 100,000 g/mol or less, such as 50,000 g/mol or less, such as 20,000 g/mol or less, such as 10,000 g/mol or less, such as 5,000 g/mol or less, such as 4,000 g/mol or less, such as 3,000 g/mol or less. Such molecular weight may be the molecular weight of the siloxane as provided to the gypsum slurry.

After crosslinking, the molecular weight of the siloxane may increase. For instance, the molecular weight may be 500 g/mol or more, such as 1,000 g/mol or more, such as 1,500 g/mol or more, such as 2,000 g/mol or more, such as 3,000 g/mol or more, such as 4,000 g/mol or more, such as 5,000 g/mol or more, such as 10,000 g/mol or more, such as 25,000 g/mol or more, such as 50,000 g/mol or more, such as 100,000 g/mol or more, such as 200,000 g/mol or more. The siloxane may have a molecular weight of 4,000,000 g/mol or less, such as 3,000,000 g/mol or less, such as 2,500,000 g/mol or less, such as 2,000,000 g/mol or less, such as 1,500,000 g/mol or less, such as 1,300,000 g/mol or less, such as 1,000,000 g/mol or less, such as 800,000 g/mol or less, such as 600,000 g/mol or less, such as 500,000 g/mol or less, such as 400,000 g/mol or less, such as 300,000 g/mol or less, such as 250,000 g/mol or less, such as 200,000 g/mol or less, such as 150,000 g/mol or less, such as 100,000 g/mol or less, such as 50,000 g/mol or less, such as 20,000 g/mol or less, such as 10,000 g/mol or less, such as 5,000 g/mol or less, such as 4,000 g/mol or less, such as 3,000 g/mol or less. Accordingly, such molecular weight may be the molecular weight of the siloxane within the gypsum slurry after crosslinking and/or in the gypsum panel, such as after crosslinking.

The siloxane may be present in the gypsum slurry in an amount of 0.001 wt. % or more, such as 0.01 wt. % or more, such as 0.02 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more based on the weight of the stucco. The siloxane may be present in an amount of 10 wt. % or less, such as 7 wt. % or less, such as 5 wt. % or less, such as 4 wt. % or less, such as 3 wt. % or less, such as 2.5 wt. % or less, such as 2 wt. % or less, such as 1.8 wt. % or less, such as 1.5 wt. % or less, such as 1 wt. % or less, such as 0.8 wt. % or less, such as 0.6 wt. % or less, such as 0.5 wt. % or less, such as 0.4 wt. % or less, such as 0.35 wt. % or less, such as 0.2 wt. % or less based on the weight of the stucco. In another embodiment, such weight percentage may be based on the weight of the gypsum slurry. In a further embodiment, such weight percentage may be based on the solids content of the gypsum slurry. In one embodiment, such weight percentage may be based on the weight of the gypsum panel. In an even further embodiment, such weight percentage may be based on the weight of the gypsum core.

Similarly, the siloxane may be present in the gypsum slurry in an amount of 0.001 lbs/ft$^3$ or more, such as 0.005 lbs/ft$^3$ or more, such as 0.01 lbs/ft$^3$ or more, such as 0.05 lbs/ft$^3$ or more, such as 0.1 lbs/ft$^3$ or more, such as 0.2 lbs/ft$^3$ or more, such as 0.5 lbs/ft$^3$ or more, such as 1 lbs/ft$^3$ or more, such as 1.5 lbs/ft$^3$ or more, such as 2 lbs/ft$^3$ or more, such as 2.5 lbs/ft$^3$ or more, such as 3 lbs/ft$^3$ or more, such as 3.5 lbs/ft$^3$ or more, such as 4 lbs/ft$^3$ or more, such as 4.5 lbs/ft$^3$ or more, such as 5 lbs/ft$^3$ or more, such as 10 lbs/ft$^3$ or more, such as 15 lbs/ft$^3$ or more, such as 20 lbs/ft$^3$ or more, such as 25 lbs/ft$^3$ or more, such as 50 lbs/ft$^3$ or more. The siloxane may be present in an amount of 100 lbs/ft$^3$ or less, such as 80 lbs/ft$^3$ or less, such as 60 lbs/ft$^3$ or less, such as 40 lbs/ft$^3$ or less, such as 25 lbs/ft$^3$ or less, such as 20 lbs/ft$^3$ or less, such as 15 lbs/ft$^3$ or less, such as 13 lbs/ft$^3$ or less, such as 11 lbs/ft$^3$ or less, such as 10 lbs/ft$^3$ or less, such as 9 lbs/ft$^3$ or less, such as 8 lbs/ft$^3$ or less, such as 7 lbs/ft$^3$ or less, such as 6 lbs/ft$^3$ or less, such as 5 lbs/ft$^3$ or less, such as 4 lbs/ft$^3$ or less, such as 3 lbs/ft$^3$ or less, such as 2 lbs/ft$^3$ or less, such as 1 lbs/ft$^3$ or less, such as 0.7 lbs/ft$^3$ or less, such as 0.5 lbs/ft$^3$ or less, such as 0.4 lbs/ft$^3$ or less, such as 0.3 lbs/ft$^3$ or less, such as 0.2 lbs/ft³ or less, such as 0.1 lbs/ft³ or less. In one embodiment, the siloxane may be present in the gypsum slurry in the above amounts in units of lbs/MSF.

The siloxane and the silicon containing compound, such as the siliconate, may be present in the gypsum slurry and resulting gypsum core in a certain amount. For instance, the weight ratio of the siloxane to the silicon containing compound, such as the siliconate, may be 50 or less, such as 40 or less, such as 30 or less, such as 20 or less, such as 10 or less, such as 8 or less, such as 6 or less, such as 4 or less, such as 3 or less, such as 2 or less, such as 1 or less, such as 0.8 or less, such as 0.6 or less, such as 0.5 or less, such as 0.4 or less, such as 0.3 or less, such as 0.2 or less, such as 0.1 or less, such as 0.05 or less. The weight ratio of the siloxane to the silicon containing compound, such as the siliconate, may be 0.001 or more, such as 0.005 or more, such as 0.01 or more, such as 0.02 or more, such as 0.05 or more, such as 0.1 or more, such as 0.2 or more, such as 0.3 or more, such as 0.4 or more, such as 0.5 or more, such as 0.6 or more, such as 0.7 or more, such as 0.8 or more, such as 0.9 or more, such as 1 or more, such as 1.01 or more, such as 1.05 or more, such as 1.1 or more, such as 1.2 or more, such as 1.3 or more, such as 1.5 or more, such as 2 or more, such as 3 or more, such as 4 or more, such as 5 or more, such as 6 or more, such as 8 or more. In one embodiment, the siloxane may be present in an amount greater than the silicon containing compound, such as the siliconate. In another embodiment, the siloxane may be present in an amount less than the silicon containing compound, such as the siliconate.

The gypsum slurry may also include other additives. In this regard, such additives are not necessarily limited by the present invention. For instance, the additives may include dispersants (e.g., sulfonates, polycarboxylate esters or ethers, melamine formaldehyde condensates, etc.), foam or foaming agents including aqueous foam (e.g. sulfates such as alkyl sulfates, alkyl ether sulfates), set accelerators (e.g., BMA, land plaster, sulfate salts, etc.), set retarders, binders, biocides (such as bactericides and/or fungicides), adhesives, pH modifiers (e.g., Portland cement, caustic soda, a hydroxide such as potassium hydroxide, lime, magnesium oxide, sodium silicate, etc., or a mixture thereof), thickeners (e.g., silica fume, Portland cement, fly ash, clay, celluloses and other fibers (e.g. cellulosic fibers, microfribrillated fibers, nanocellulosic fibers, etc.), high molecular weight polymers, etc.), leveling agents, non-leveling agents, starches (such as pregelatinized starch, non-pregelatinized starch, and/or an acid modified starch), colorants, fire retardants or additives (e.g., silica, silicates, expandable materials such as vermiculite, perlite, etc.), water repellants, fillers (e.g., glass fibers), waxes (e.g., silicones, etc.), secondary phosphates (e.g., condensed phosphates or orthophosphates including trimetaphosphates, polyphosphates, and/or cyclophosphates, etc.), sound dampening polymers (e.g., viscoelastic polymers/glues, such as those including an acrylic/acrylate polymer, etc.; polymers with low glass transition temperature, etc.), mixtures thereof, natural and synthetic polymers, etc. In general, it should be understood that the types and amounts of such additives are not necessarily limited by the present invention.

Each additive may be present in the gypsum slurry in an amount of 0.0001 wt. % or more, such as 0.001 wt. % or more, such as 0.01 wt. % or more, such as 0.02 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more, such as 1 wt. % or more, such as 2 wt. % or more based on the weight of the stucco. The additive may be present in an amount of 20 wt. % or less, such as 15 wt. % or less, 10 wt. % or less, such as 7 wt. % or less, such as 5 wt. % or less, such as 4 wt. % or less, such as 3 wt. % or less, such as 2.5 wt. % or less, such as 2 wt. % or less, such as 1.8 wt. % or less, such as 1.5 wt. % or less, such as 1 wt. % or less, such as 0.8 wt. % or less, such as 0.6 wt. % or less, such as 0.5 wt. % or less, such as 0.4 wt. % or less, such as 0.35 wt. % or less, such as 0.2 wt. % or less based on the weight of the stucco. The aforementioned weight percentages may also apply based on the weight of the gypsum in the gypsum panel. In addition, the aforementioned weight percentages may also apply based on the weight of the gypsum panel. Further, the aforementioned weight percentages may also apply based on the weight of the gypsum core. Also, the aforementioned weight percentages may also apply based on the solids content of the gypsum slurry. Further, the aforementioned weight percentages may be based on the weight of the gypsum slurry.

Similarly, each additive may be provided in an amount of 0.001 lbs/ft³ or more, such as 0.005 lbs/ft³ or more, such as 0.01 lbs/ft³ or more, such as 0.05 lbs/ft³ or more, such as 0.1 lbs/ft³ or more, such as 0.2 lbs/ft³ or more, such as 0.5 lbs/ft³ or more, such as 1 lbs/ft³ or more, such as 1.5 lbs/ft³ or more, such as 2 lbs/ft³ or more, such as 2.5 lbs/ft³ or more, such as 3 lbs/ft³ or more, such as 3.5 lbs/ft³ or more, such as 4 lbs/ft³ or more, such as 4.5 lbs/ft³ or more, such as 5 lbs/ft³ or more, such as 10 lbs/ft³ or more, such as 15 lbs/ft³ or more, such as 20 lbs/ft³ or more, such as 25 lbs/ft³ or more, such as 50 lbs/ft³ or more. The additive may be provided in an amount of 100 lbs/ft³ or less, such as 80 lbs/ft³ or less, such as 60 lbs/ft³ or less, such as 40 lbs/ft³ or less, such as 25 lbs/ft³ or less, such as 20 lbs/ft³ or less, such as 15 lbs/ft³ or less, such as 13 lbs/ft³ or less, such as 11 lbs/ft³ or less, such as 10 lbs/ft³ or less, such as 9 lbs/ft³ or less, such as 8 lbs/ft³ or less, such as 7 lbs/ft³ or less, such as 6 lbs/ft³ or less, such as 5 lbs/ft³ or less, such as 4 lbs/ft³ or less, such as 3 lbs/ft³ or less, such as 2 lbs/ft³ or less, such as 1 lbs/ft³ or less, such as 0.7 lbs/ft³ or less, such as 0.5 lbs/ft³ or less, such as 0.4 lbs/ft³ or less, such as 0.3 lbs/ft³ or less, such as 0.2 lbs/ft³ or less, such as 0.1 lbs/ft³ or less. In one embodiment, the additive may be present in the gypsum slurry in the above amounts in units of lbs/MSF.

The manner in which the components for the gypsum slurry are combined is not necessarily limited. For instance, the gypsum slurry can be made using any method or device generally known in the art. In particular, the components of the slurry can be mixed or combined using any method or device generally known in the art. For instance, the components of the gypsum slurry may be combined in any type of device, such as a mixer and in particular a pin mixer. In this regard, the manner in which the components are incorporated into the gypsum slurry is not necessarily limited by the present invention. Such components may be provided prior to a mixing device, directly into a mixing device, and/or even after the mixing device. For instance, the respective components may be provided prior to a mixing device. In another embodiment, the respective components may be provided directly into a mixing device. Alternatively, the respective components may be provided after the mixing device (such as to the canister or boot, using a secondary mixer, or applied directly onto the slurry after a mixing device) and may be added directly or as part of a mixture. Whether provided prior to, into, or after the mixing device, the components may be combined directly with another component of the gypsum slurry. In addition, whether providing the components prior to or after the mixing device or directly into the mixing device, the compound may be delivered as a solid, as a dispersion/solution, or a combination thereof.

Upon deposition of the gypsum slurry, the calcium sulfate hemihydrate reacts with the water to hydrate the calcium sulfate hemihydrate into a matrix of calcium sulfate dihydrate. Such reaction may allow for the gypsum to set and become firm thereby allowing for the panels to be cut at the desired length. In this regard, the method may comprise a step of reacting calcium sulfate hemihydrate with water to form calcium sulfate dihydrate or allowing the calcium sulfate hemihydrate to hydrate to calcium sulfate dihydrate. In this regard, the method may allow for the slurry to set to form a gypsum panel. In addition, during this process, the method may allow for dewatering, such as evaporating, of the gypsum slurry, in particular dewatering, such as evaporating, any free water instead of combined water of the gypsum slurry. Such dewatering may occur prior to the removal of any free moisture or water in a heating or drying device after a cutting step. Thereafter, the method may also comprise a step of cutting a continuous gypsum sheet into a gypsum panel. Then, after the cutting step, the method may comprise a step of supplying the gypsum panel to a heating or drying device. For instance, such a heating or drying device may be a kiln and may allow for removal of any free water. The temperature and time required for drying in such heating device are not necessarily limited by the present invention.

During the heating or drying step, one or more gases may be generated. For example, the gases may include water vapor as well as other gases generated due to the drying/heating of the gypsum panel. Further, such one or more gases may be presented as a gaseous mixture. For instance, the gaseous mixture may also include particulates, such as solid particulates and/or liquid particulates. Such particulates may be entrained within the one or more gases in the gaseous mixture. The gaseous mixture may be introduced into a thermal oxidizer to control any potential air pollution exiting the manufacturing system and into the atmosphere. For instance, within the oxidizer, hydrocarbons may be chemically oxidized to form carbon dioxide and water.

In general, the gaseous mixture may be transferred or provided to the thermal oxidizer from the heating or drying device. For instance, the gaseous mixture may be transported through a conduit, such as a pipe, tube, or other means for transferring gaseous mixtures in manufacturing processes prior to emission.

In one specific embodiment, the thermal oxidizer may be a regenerative thermal oxidizer. Without intending to be limited by theory, the oxidizer may be utilized to combust emissions resulting from the process. In general, the regenerative thermal oxidizer may include a ceramic bed. The ceramic bed may be heated from a previous oxidation cycle to preheat an input gaseous mixture to at least partially oxidize the mixture. For instance, the gaseous mixture may enter a chamber, such as a combustion chamber, that is heated to reach a target temperature for oxidation. Such temperature may be 500° C. or more, such as 550° C. or more, such as 600° C. or more, such as 650° C. or more, such as 700° C. or more, such as 750° C. or more, such as 800° C. or more. In addition, such temperature may be 1200° C. or less, such as 1100° C. or less, such as 1000° C. or less, such as 950° C. or less, such as 900° C. or less, such as 850° C. or less, such as 800° C. or less.

The regenerative thermal oxidizer may include a block including a plurality of channels which define a cellular pattern in a cross-section view of the block. In this regard, the pattern may include regular sub-patterns such that for any given pattern, a central channel may be surrounded by a plurality of surrounding channels.

The regenerative thermal oxidizer may include at least two heat exchange columns, each in communication with each other. For instance, the gaseous mixture entering for treatment may be preheated before oxidation. In general, a heat exchange column is provided to preheat. The column may be packed with a heat exchange material. The process gas mixture may be fed through a previously heated heat exchange column, which in turns heats the process gaseous mixture, such as to a temperature approaching or attaining the desired oxidation temperature. This preheated gaseous mixture is directed into a combustion zone in a chamber wherein further oxidation may be completed. The processed gas mixture may then be directed out of the combustion zone through the heat exchange column or a second heat exchange column. As the hot processed gas continues through this column, the gas transfers its heat to the heat exchange media in that column, cooling the gas and preheating the heat exchange media so that another batch of process gas mixture may be preheated prior to the oxidation treatment.

The regenerative thermal oxidizer may be a two-canister oxidizer or a three-canister thermal oxidizer. In other embodiments, the regenerative thermal oxidizer may be a multi-canister oxidizer including more than three canisters. In general, with a two-canister oxidizer, the exhaust stream may be fed or provided into the first heat exchange bed where it may pass directly through the media to begin the heating process. It may then enter a combustion chamber where the stream or mixture is heated for combustion in the oxidation process. Then, the stream or mixture which has been relatively cleaned may be provided to a second heat exchange bed to be cooled. The stream or mixture may pass through another bed of media to reduce the temperature of the stream or mixture while increasing the temperature of the media. Thereafter, the cleaned stream or mixture may be released into the atmosphere.

In general, with a three-canister oxidizer, the exhaust stream may be fed or provided into the first heat exchange bed where it may pass directly through the media to begin the heating process. It may then enter a combustion chamber where the stream or mixture is heated for combustion in the oxidation process. Then, the stream or mixture which has been relatively cleaned may be provided to a second heat exchange bed to be cooled. The stream or mixture may pass through a bed of media to reduce the temperature of the stream or mixture while increasing the temperature of the media. Then, in a final chamber, any remaining VOCs in the cleaned stream may be trapped, such as by purging the stream or mixture with clean air. Thereafter, the cleaned stream or mixture may be released into the atmosphere.

Prior to entering the oxidizer, the gaseous mixture may enter into a filter. In this regard, the gaseous mixture may be filtered to reduce or minimize solid particulates prior to entry into the oxidizer. For instance, the filter may be utilized to reduce 1 wt. % or more, such as 5 wt. % or more, such as 10 wt. % or more, such as 15 wt. % or more, such as 20 wt. % or more, such as 25 wt. % or more, such as 30 wt. % or more, such as 35 wt. % or more, such as 40 wt. % or more, such as 45 wt. % or more, such as 50 wt. % or more, such as 60 wt. % or more, such as 70 wt. % or more of the particulates from the gaseous mixture. The filter may be utilized to reduce 100 wt. % or less, such as 90 wt. % or less, such as 80 wt. % or less, such as 70 wt. % or less, such as 60 wt. % or less, such as 50 wt. % or less, such as 40 wt. % or less, such as 30 wt. % or less, such as 20 wt. % or less, such as 10 wt. % or less of the particulates from the gaseous mixture.

In one embodiment, the gypsum core of the gypsum panel may include a first gypsum core layer and a second gypsum core layer. The first gypsum core layer may be between the first facing material (i.e., front of the panel) and the second gypsum core layer. In addition, the first gypsum core layer may have a density greater than the second gypsum core layer. Accordingly, the first gypsum core layer may be formed using a gypsum slurry without the use of a foaming agent or with a reduced amount of foaming agent, which may be utilized in forming the second gypsum core layer. In this regard, in one embodiment, the first gypsum core layer may have the same composition as the second gypsum core layer except that the second gypsum core layer may be formed using a foaming agent or a greater amount of foaming agent.

In one embodiment, the gypsum core may also include a third gypsum core layer. The third gypsum core layer may be provided between the second gypsum core layer and a second facing material. Like the first gypsum core layer, the third gypsum core layer may also be a dense gypsum core layer. In particular, the third gypsum core layer may have a density greater than the second gypsum core layer. Accordingly, the third gypsum core layer may be formed using a gypsum slurry without the use of a foaming agent or with a reduced amount of foaming agent, which may be utilized in forming the second gypsum core layer. In this regard, in one embodiment, the third gypsum core layer may have the same composition as the second gypsum core layer except that the second gypsum core layer may be formed using a foaming agent or a greater amount of foaming agent.

When the gypsum core includes multiple gypsum core layers, the gypsum slurry may be deposited in multiple steps for forming the gypsum core. For instance, each gypsum core layer may require a separate deposition of gypsum slurry. In this regard, with a first gypsum core layer and a second gypsum core layer, a first gypsum slurry may be deposited followed by a second gypsum slurry. The first gypsum slurry and the second gypsum slurry may have the same composition except that the second gypsum slurry may include a foaming agent or more foaming agent than the first gypsum slurry. In this regard, in one embodiment, the first gypsum slurry may not include a foaming agent. Accordingly, the first gypsum slurry may result in a dense gypsum core layer, in particular a non-foamed gypsum core layer. Such gypsum core layer may have a density greater than the gypsum core layer formed from the second gypsum slurry, or foamed gypsum core layer.

Similarly, when the gypsum core includes three gypsum core layers, the gypsum slurry may be deposited in three steps for forming the gypsum core. For example, a first and second gypsum slurry may be deposited as indicated above and a third gypsum slurry may be deposited onto the second gypsum slurry. The third gypsum slurry and the second gypsum slurry may have the same composition except that the second gypsum slurry may include a foaming agent or more foaming agent than the third gypsum slurry. In this regard, in one embodiment, the third gypsum slurry may not include a foaming agent. Accordingly, the third gypsum slurry may result in a dense gypsum core layer, in particular a non-foamed gypsum core layer. Such gypsum core layer may have a density greater than the gypsum core layer formed from the second gypsum slurry, or foamed gypsum core layer.

The first gypsum core layer may have a thickness that is 0.5% or more, such as 1% or more, such as 2% or more, such as 3% or more, such as 4% or more, such as 5% or more, such as 10% or more, such as 15% or more than the thickness of the second (or foamed) gypsum core layer. The thickness may be 80% or less, such as 60% or less, such as 50% or less, such as 40% or less, such as 30% or less, such as 25% or less, such as 20% or less, such as 15% or less, such as 10% or less, such as 8% or less, such as 5% or less the thickness of the second (or foamed) gypsum core layer. In one embodiment, such relationship may also be between the third gypsum core layer and the second gypsum core layer.

The density of the second (or foamed) gypsum core layer may be 0.5% or more, such as 1% or more, such as 2% or more, such as 3% or more, such as 4% or more, such as 5% or more, such as 10% or more, such as 15% or more the density of the first (or non-foamed) gypsum core layer. The density of the second (or foamed) gypsum core layer may be 80% or less, such as 60% or less, such as 50% or less, such as 40% or less, such as 30% or less, such as 25% or less, such as 20% or less, such as 15% or less, such as 10% or less, such as 8% or less, such as 5% or less the density of the first (or non-foamed) gypsum core layer. In one embodiment, such relationship may also be between the third gypsum core layer and the second gypsum core layer. In addition, in one embodiment, all of the gypsum core layers may have a different density.

In addition, the first gypsum core layer, the second gypsum core layer, and/or the third gypsum core layer may also have the additives as mentioned above. For instance, as indicated herein, the gypsum core may include a silicon containing compound, such as the siliconate, and/or a siloxane. In this regard, in one embodiment, the first gypsum core layer may include the silicon containing compound, such as the siliconate, and/or siloxane as mentioned above. For instance, they may be present in the amounts as also mentioned herein. In another embodiment, the second gypsum core layer may include the silicon containing compound, such as the siliconate, and/or siloxane as mentioned above. For instance, they may be present in the amounts as also mentioned herein. In a further embodiment, the third gypsum core layer may include the silicon containing compound, such as the siliconate, and/or siloxane as mentioned above. For instance, they may be present in the amounts as also mentioned herein. In an even further embodiment, the first gypsum core layer and the second gypsum core layer may include the silicon containing compound, such as the siliconate, and/or siloxane as mentioned above. In another further embodiment, the first gypsum core layer, the second gypsum core layer, and the third gypsum core layer may include the silicon containing compound, such as the siliconate, and/or siloxane as mentioned above. For instance, they may be present in the amounts as also mentioned herein. However, in one embodiment, it should be understood that one or two of the aforementioned core layers may not include the silicon containing compound, such as the siliconate, and/or siloxane. For instance, the silicon containing compound, such as the siliconate, and/or siloxane may be present in an amount of less than 0.1 wt. %, such as less than 0.05 wt. %, such as less than 0.01 wt. %, such as less than 0.005 wt. %.

The gypsum panel disclosed herein may have many applications. For instance, the gypsum panel may be used as a standalone panel in construction for the preparation of walls, ceilings, floors, etc. In particular, the gypsum panel may be utilized in environments having high moisture or exposure to water. As used in the present disclosure, the term "gypsum panel," generally refers to any panel, sheet, or planar structure, either uniform or formed by connected portions or pieces, that is constructed to at least partially establish one or more physical boundaries. Such existing, installed, or otherwise established or installed wall or ceiling structures comprise materials that may include, as non-limiting examples, gypsum, stone, ceramic, cement, wood, composite, or metal materials. The installed gypsum panel forms part of a building structure, such as a wall or ceiling.

The thickness of the gypsum panel, and in particular, the gypsum core, is not necessarily limited and may be from about 0.25 inches to about 1 inch. For instance, the thickness may be at least ¼ inches, such as at least 5/16 inches, such as at least ⅜ inches, such as at least ½ inches, such as at least ⅝ inches, such as at least ¾ inches, such as at least 1 inch. In this regard, the thickness may be about any one of the aforementioned values. For instance, the thickness may be about ¼ inches. Alternatively, the thickness may be about ⅜ inches. In another embodiment, the thickness may be about ½ inches. In a further embodiment, the thickness may be about ⅝ inches. In another further embodiment, thickness may be about 1 inch. In addition, at least two gypsum panels may be combined to create another gypsum panel, such as a composite gypsum panel. For example, at least two gypsum panels having a thickness of about 5/16 inches each may be combined or sandwiched to create a gypsum panel having a thickness of about ⅝ inches. While this is one example, it should be understood that any combination of gypsum panels may be utilized to prepare a sandwiched gypsum panel. With regard to the thickness, the term "about" may be defined as within 10%, such as within 5%, such as within 4%, such as within 3%, such as within 2%, such as within 1%. However, it should be understood that the present invention is not necessarily limited by the aforementioned thicknesses.

In addition, the panel weight of the gypsum panel is not necessarily limited. For instance, the gypsum panel may have a panel weight of 500 lbs/MSF or more, such as about 600 lbs/MSF or more, such as about 700 lbs/MSF or more, such as about 800 lbs/MSF or more, such as about 900 lbs/MSF or more, such as about 1000 lbs/MSF or more, such as about 1100 lbs/MSF or more, such as about 1200 lbs/MSF or more, such as about 1300 lbs/MSF or more, such as about 1400 lbs/MSF or more, such as about 1500 lbs/MSF or more. The panel weight may be about 7000 lbs/MSF or less, such as about 6000 lbs/MSF or less, such as about 5000 lbs/MSF or less, such as about 4000 lbs/MSF or less, such as about 3000 lbs/MSF or less, such as about 2500 lbs/MSF or less, such as about 2000 lbs/MSF or less, such as about 1800 lbs/MSF or less, such as about 1600 lbs/MSF or less, such as about 1500 lbs/MSF or less, such as about 1400 lbs/MSF or less, such as about 1300 lbs/MSF or less, such as about 1200 lbs/MSF or less. Such panel weight may be a dry panel weight such as after the panel leaves the heating or drying device (e.g., kiln).

In addition, the gypsum panel may have a density of about 5 pcf or more, such as about 6 pcf or more, such as about 7 pcf or more, such as about 8 pcf or more, such as about 9 pcf or more, such as about 10 pcf or more, such as about 11 pcf or more, such as about 12 pcf or more, such as about 13 pcf or more, such as about 14 pcf or more, such as about 15 pcf or more. The panel may have a density of about 60 pcf or less, such as about 50 pcf or less, such as about 40 pcf or less, such as about 35 pcf or less, such as about 33 pcf or less, such as about 30 pcf or less, such as about 28 pcf or less, such as about 25 pcf or less, such as about 23 pcf or less, such as about 20 pcf or less, such as about 18 pcf or less, such as about 15 pcf or less, such as about 14 pcf or less, such as about 13 pcf or less, such as about 12 pcf or less, such as about 11 pcf or less, such as about 10 pcf or less.

The gypsum panel may have a certain nail pull resistance, which generally is a measure of the force required to pull a gypsum panel off a wall by forcing a fastening nail through the panel. The values obtained from the nail pull test generally indicate the maximum stress achieved while the fastener head penetrates through the panel surface and core. In this regard, the gypsum panel exhibits a nail pull resistance of at least about 25 $lb_f$, such as at least about 30 pounds, such as at least about 35 $lb_f$, such as at least about 40 $lb_f$, such as at least about 45 $lb_f$, such as at least about 50 $lb_f$, such as at least about 55 $lb_f$, such as at least about 60 $lb_f$, such as at least about 65 $lb_f$, such as at least about 70 $lb_f$, such as at least about 75 $lb_f$, such as at least about 77 $lb_f$, such as at least about 80 $lb_f$, such as at least about 85 $lb_f$, such as at least about 90 $lb_f$, such as at least about 95 $lb_f$, such as at least about 100 $lb_f$ as tested according to ASTM C1396. The nail pull resistance may be about 400 $lb_f$ or less, such as about 300 $lb_f$ or less, such as about 200 $lb_f$ or less, such as about 150 $lb_f$ or less, such as about 140 $lb_f$ or less, such as about 130 $lb_f$ or less, such as about 120 $lb_f$ or less, such as about 110 $lb_f$ or less, such as about 105 $lb_f$ or less, such as about 100 $lb_f$ or less, such as about 95 $lb_f$ or less, such as about 90 $lb_f$ or less, such as about 85 $lb_f$ or less, such as about 80 $lb_f$ or less as tested according to ASTM C1396. Such nail pull resistance may be based upon the thickness of the gypsum panel. For instance, when conducting a test, such nail pull resistance values may vary depending on the thickness of the gypsum panel. As an example, the nail pull resistance values above may be for a ⅝ inch panel. However, it should be understood that instead of a ⅝ inch panel, such nail pull resistance values may be for any other thickness gypsum panel as mentioned herein.

The gypsum panel may have a certain compressive strength. For instance, the compressive strength may be about 150 psi or more, such as about 200 psi or more, such as about 250 psi or more, such as about 300 psi or more, such as about 350 psi or more, such as about 375 psi or more, such as about 400 psi or more, such as about 500 psi or more as tested according to ASTM C473. The compressive strength may be about 3000 psi or less, such as about 2500 psi or less, such as about 2000 psi or less, such as about 1700 psi or less, such as about 1500 psi or less, such as about 1300 psi or less, such as about 1100 psi or less, such as about 1000 psi or less, such as about 900 psi or less, such as about 800 psi or less, such as about 700 psi or less, such as about 600 psi or less, such as about 500 psi or less. Such compressive strength may be based upon the density and thickness of the gypsum panel. For instance, when conducting a test, such compressive strength values may vary depending on the thickness of the gypsum panel. As an example, the compressive strength values above may be for a ⅝ inch panel. However, it should be understood that instead of a ⅝ inch panel, such compressive strength values may be for any other thickness gypsum panel as mentioned herein.

In addition, the gypsum panel may have a core hardness of at least about 8 $lb_f$, such as at least about 10 $lb_f$, such as at least about 11 $lb_f$, such as at least about 12 $lb_f$, such as at least about 15 $lb_f$, such as at least about 18 $lb_f$, such as at least about 20 $lb_f$ as tested according to ASTM C1396. The gypsum panel may have a core hardness of 50 $lb_f$ or less, such as about 40 $lb_f$ or less, such as about 35 $lb_f$ or less, such as about 30 $lb_f$ or less, such as about 25 $lb_f$ or less, such as about 20 $lb_f$ or less, such as about 18 $lb_f$ or less, such as about 15 lb$_f$ or less as tested according to ASTM C1396. In addition, the gypsum panel may have an end hardness according to the aforementioned values. Such core hardness may be based upon the thickness of the gypsum panel. For instance, when conducting a test, such core hardness values may vary depending on the thickness of the gypsum panel. As an example, the core hardness values above may be for a ⅝ inch panel. However, it should be understood that instead of a ⅝ inch panel, such core hardness values may be for any other thickness gypsum panel as mentioned herein.

In addition, the gypsum panel may have an edge hardness of at least about 8 lb$_f$, such as at least about 10 lb$_f$, such as at least about 11 lb$_f$, such as at least about 12 lb$_f$, such as at least about 15 lb$_f$, such as at least about 18 lb$_f$, such as at least about 20 lb$_f$, such as at least about 24 lb$_f$, such as at least about 28 lb$_f$, such as at least about 30 lb$_f$, such as at least about 33 lb$_f$ as tested according to ASTM C1396 and ASTM C473. The gypsum panel may have an edge hardness of about 50 lb$_f$ or less, such as about 40 lb$_f$ or less, such as about 35 lb$_f$ or less, such as about 30 lb$_f$ or less, such as about 25 lb$_f$ or less, such as about 20 lb$_f$ or less, such as about 18 lb$_f$ or less, such as about 15 lb$_f$ or less as tested according to ASTM C1396 and ASTM C473. Such edge hardness may be based upon the thickness of the gypsum panel. For instance, when conducting a test, such edge hardness values may vary depending on the thickness of the gypsum panel. As an example, the edge hardness values above may be for a ⅝ inch panel. However, it should be understood that instead of a ⅝ inch panel, such edge hardness values may be for any other thickness gypsum panel as mentioned herein.

In addition, it may also be desired to have an effective bond between the facing material and the gypsum core. Typically, a humidified bond test is performed for 2 hours in a humidity chamber at 90° F. and 90% humidity. In this test, after exposure, the facing material is removed to determine how much remains on the gypsum panel. The percent coverage (or surface area) can be determined using various optical analytical techniques. In this regard, the facing material may cover 100% or less, such as less than 90%, such as less than 80%, such as less than 70%, such as less than 60%, such as less than 50%, such as less than 40%, such as less than 30%, such as less than 25%, such as less than 20%, such as less than 15%, such as less than 10%, such as less than 9%, such as less than 8% of the surface area of the gypsum core upon conducting the test. Such percentage may be for a face of the gypsum panel. Alternatively, such percentage may be for a back of the gypsum panel. Further, such percentages may apply to the face and the back of the gypsum panel. In addition, such values may be for an average of at least 3 gypsum panel, such as at least 5 gypsum panels.

EXAMPLES

Example 1

Gypsum panels were made with siloxane and with or without the use of a siliconate. In addition, the silica particulate emissions (grains per standard cubic feet—gr/dscf) were determined for these panels in accordance with EPA Method 5/Method 202 prior to any introduction into a thermal oxidizer in order to determine the effect of the siliconate. As can be seen, panels made using a siliconate demonstrated reduced emissions.

|  | Emissions Without Siliconate Use (gr/dscf) | Emissions With Siliconate Use (gr/dscf) |
| --- | --- | --- |
| 1 | 0.0281 | 0.0235 |
| 2 | 0.0301 | 0.0249 |
| 3 | 0.0467 | 0.0248 |
| Avg | 0.0350 | 0.0244 |

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

The invention claimed is:

1. A method of making a gypsum panel, the method comprising:
   providing a first facing material;
   providing a gypsum slurry including calcium sulfate hemihydrate, water, and a silicon containing compound onto the first facing material;
   providing a second facing material onto the gypsum slurry to form a continuous gypsum sheet;
   cutting the continuous gypsum sheet to form a gypsum panel;
   supplying the gypsum panel to a heating or drying device; and
   providing a gaseous mixture from the heating or drying device to a regenerative thermal oxidizer, wherein a silica particulate emission in the gaseous mixture prior to entering the thermal oxidizer is 0.035 gr/dscf or less.

2. The method of claim 1, wherein the silicon containing compound comprises a siliconate.

3. The method of claim 2, wherein the siliconate has the following structure:

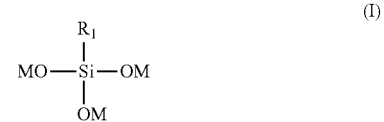

(I)

wherein
R$_1$ is H, halogen, alkyl, aryl, heteroaryl, cycloalkyl, haloalkyl, haloaryl, perhaloalkyl, or perhaloaryl; and
M is an alkali metal.

4. The method of claim 3, wherein R; is alkyl.

5. The method of claim 2, wherein the siliconate comprises sodium methylsiliconate, sodium ethylsiliconate, potassium ethylsiliconate, sodium propylsiliconate, potassium propylsiliconate, sodium isopropylsiliconate, potassium isopropylsiliconate, sodium butylsiliconate, potassium butylsiliconate, sodium hexylsiliconate, potassium hexylsiliconate, sodium octylsiliconate, potassium octylsiliconate, or a mixture thereof.

6. The method of claim 2, wherein the siliconate comprises potassium methylsiliconate.

7. The method of claim 1, wherein the silicon containing compound comprises silica fume.

8. The method of claim 1, wherein the gypsum slurry further comprises a siloxane.

9. The method of claim 8, wherein the siloxane has the following structure:

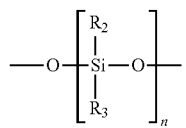

(II)

wherein, n is an integer greater than 1; and $R_2$ and $R_3$ are independently hydrogen, halogen, alkyl, cycloalkyl, aryl, heteroaryl, haloalkyl, haloaryl, alkoxy, carboxyalkyl, or alkenyl.

10. The method of claim 9, wherein $R_2$ and $R_3$ are independently hydrogen, halogen, alkyl, or cycloalkyl.

11. The method of claim 8, wherein the siloxane comprises dimethyidiphenylpolysiloxane, dimethyl/methylphenylpolysiloxane, polymethylphenylsiloxane, methylphenyl/dimethylsiloxane, vinyldimethyl terminated polydimethylsiloxane, vinylmethyl/dimethylpolysiloxane, vinyldimethyl terminated vinylmethyl/dimethylpolysiloxane, divinylmethyl terminated polydimethylsiloxane, vinylphenylmethyl terminated polydimethylsiloxane, dimethylhydro terminated polydimethylsiloxane, methylhydro/dimethylpolysiloxane, methylhydro terminated methyloctylpolysiloxane, methylhydro/phenylmethyl polysiloxane, fluoro-modified polysiloxane, or a mixture thereof.

12. The method of claim 8, wherein the siloxane comprises polydimethylsiloxane.

13. The method of claim 8, wherein the siloxane comprises polymethylhydrogensiloxane.

14. The method of claim 8, wherein the siloxane is cross-linked within the gypsum slurry and has a molecular weight of from 500 g/mol to 4,000,000 g/mol.

15. The method of claim 8, wherein the weight ratio of the siloxane to the silicon containing compound is from 0.0001 to 50.

16. The method of claim 1, wherein the gypsum slurry comprises a pH modifier.

17. The method of claim 16, wherein the pH modifier comprises caustic soda, magnesium oxide, sodium silicate, or a mixture thereof.

18. The method of claim 16, wherein the pH modifier comprises Portland cement.

19. The method of claim 16, wherein the pH modifier comprises lime.

20. The method of claim 16, wherein the pH modifier comprises a hydroxide.

21. The method of claim 1, wherein the gaseous mixture includes solid particulates.

22. The method of claim 1, wherein the gaseous mixture is provided through a conduit to the regenerative thermal oxidizer.

23. The method of claim 1, wherein the gaseous mixture is filtered prior to entering the regenerative thermal oxidizer.

* * * * *